Sept. 3, 1946.   J. J. WHARAM ET AL   2,406,933
CROSS SHAFT MOUNTING
Filed March 16, 1945

J. J. Wharam
C. P. Pinardi
INVENTORS

Patented Sept. 3, 1946

2,406,933

UNITED STATES PATENT OFFICE 2,406,933

CROSS SHAFT MOUNTING

John J. Wharam and Charles P. Pinardi, Dearborn, Mich., assignors to Ford Motor Company, Dearborn, Mich., a corporation of Delaware Application March 16, 1945, Serial No. 583,101

3 Claims. (Cl. 180—77)

This invention relates to the construction of motor vehicles; and, more particularly, to the trunnion or cross shaft mountings for the clutch and brake pedals and the arrangement of the clutch and brake operating means therewith.

The purpose of this invention is to devise an improved mounting means for the trunnions or cross shaft on which the clutch and brake pedals of a motor vehicle are rotatably mounted with respect to the frame. Another object is to provide an improved mounting for the brake and clutch operating means activated by these pedals and integrating the construction so formed with the frame of the vehicle itself. An advantage of the present invention lies in the fact that it affords an extremely economical and easily formed shaft mounting per se; and this mounting is particularly adaptable to a specific frame arrangement in conjunction with a mechanism operated therefrom. Another advantage is that the shaft mounting can be formed from the stampings and readily assembled, forming units of superior strength which are readily attachable to the vehicle and which furnish adequate support to the cross shafts. Still another advantage of the construction is that by providing an auxiliary longitudinally extending frame member in conjunction with the regular sill and X member, the cross shaft and the clutch operating means and brake master cylinder may be mounted in such a manner that the stresses imposed thereon by operation of the pedals are largely equalized. In addition, the structure is greatly simplified and a minimum of room is required for it.

With these and other considerations in view, the invention consists of the apparatus described in the specification, claimed in the claims and illustrated in the accompanying drawing, in which:

Figures 1, 2:
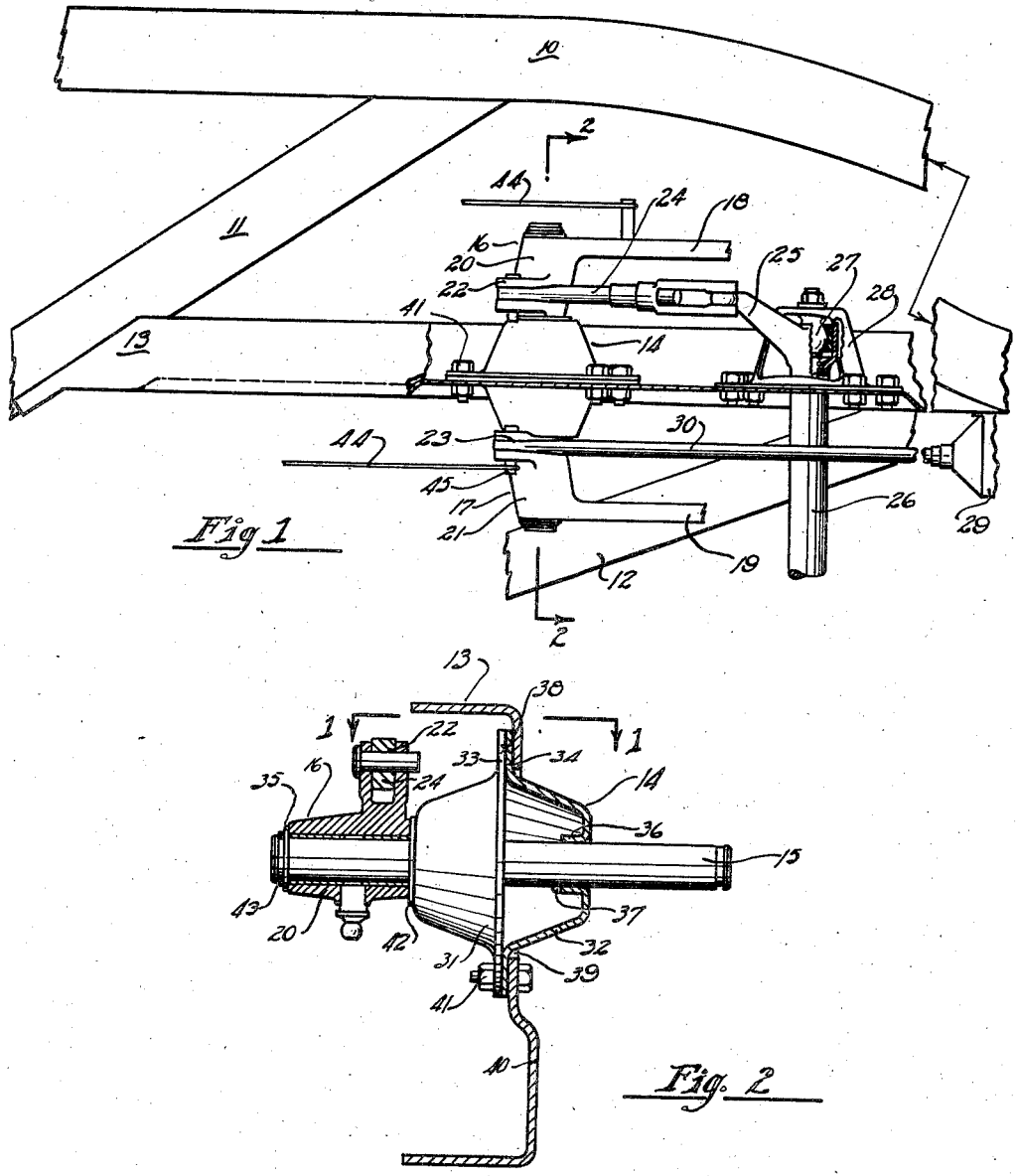
Figure 1 is a partial plan view of the forward left-hand portion of an automobile frame showing the improved shaft mounting and its arrangement with respect to the components operated therefrom, a section being taken through the auxiliary member substantially as indicated by the line 1—1 of Figure 2, and an intermediate part being omitted as indicated by the broken lines.
Figure 2 is a partial transverse section, on a larger scale, taken as indicated by the line 2—2 of Figure 1 showing the detailed construction of the shaft mounting and its method of attachment to the vehicle frame members.

Referring to Figure 1, 10 indicates the side member or sill of the usual automobile frame having an X member 11, and the front oblique member 12. In addition, an auxiliary frame member 13, is permanently attached at its rear end to the X member 11, as by welding and runs substantially longitudinally forwardly therefrom to an intersection with the inwardly curving forward portion of the side member 10, to which its front end is secured. As shown in Figure 2, the auxiliary member 13 is a modified channel shape with its web 40 disposed vertically. Secured to it is the trunnion or cross shaft mounting 14, supporting the cross shaft 15, on which are rotatably mounted the clutch pedal 16, and the brake pedal 17. These pedals have major arms 18 and 19, respectively, which extend forwardly and upwardly from the hubs 20 and 21 through the floor board of the vehicle terminating in the usual foot pad; and the shorter linkage arms 22 and 23, to which the operating linkage is attached, also integral with the hubs 20 and 21.

The linkage referred to comprises a clutch link 24, engaging the arm 25, on the clutch operating shaft 26. This latter shaft is resiliently mounted on the ball joint 27, supported in the anchor 28 mounted on the auxiliary frame member 13, and its inner end arm has the usual forked connection which permits the operation of the clutch without transmitting the vibrations of the resiliently supported engine to the frame. The brake master cylinder is shown at 29, also attached to the auxiliary frame member 13 on the side opposite the anchor 28 for the clutch operating shaft; and is operated through the brake rod 30, leading from the linkage arm 23 associated with the brake pedal. It will thus be noted that both of these actuating means are mounted on auxiliary frame member 13, but on opposite sides thereof.

Reference is now made to Figure 2 showing the details of the anchor construction itself. This comprises essentially two bell-shaped stampings 31 and 32. Each of these has circumferential outer flanges 33 and 34 and inwardly turned central flanges as shown at 36 at the closed end of the bell.

In assembling the anchor, the bell 32 is pressed on the cross shaft 15 to the position shown and welded to it as by the bead 37 or alternatively by spot-welding to the flange 36. The co-operating bell 31 is then pressed on the shaft 15 from the opposite end until the flanges 33 and 34 are in contact. These flanges are then spot-welded together, as indicated in 38 to complete the mounting. It will be noted that the central flanges of each bell form an adequate support for the cross shaft which is further anchored in position by being welded to at least one of them. Moreover, the complete mounting is held together by the welds through the outer flanges. This provides the complete mounting subassembly 14 for application to the chassis. The preferred method of mounting this is by piercing an aperture 39 in the web 40, of the frame member 13 somewhat larger than the bell portion of the mounting 14. The mounting is then inserted into the aperture 39 from one side until the outer flange 34 abuts against it. The mounting 14 is then lined up and bolted into position to the web 40 by the bolt 41. The washers 42 are then placed on the shaft ends and the pedals 16 and 17 installed on the respective extending portions of the cross shaft 15 and secured in place by the washer 35 and retaining rings 43. The links 24 and 30 are then attached between the arms 22 and 23 and the clutch operating shaft and the brake master cylinder, which are also bolted to the web 40 of the frame member 13. The return springs 44, leading from the pins 45 to the X member 11 are installed, resiliently urging the pedals to their normal position.

The principal advantage of the present construction is that it provides an integrated shaft mounting which is readily constructed from two simple stampings and which can be readily applied to the motor vehicle. The provision of an auxiliary frame member supporting the shaft mounting, as well as the clutch actuating shaft and the master brake cylinder, adds markedly to the value of the device. It will be noted that the steps required to fabricate the mounting are simple and that this general type of a central anchorage for the shaft simplifies the installation of the mounting. It also will be noted that by mounting the actuated means, the clutch operating shaft and the brake master cylinder on the same frame member on opposite sides thereof tends to equalize the forces imposed during such periods when such forces are at a maximum as when the clutch is disengaged and the brake is applied. The frame, proper, is not crowded up with individual mountings for the pedals, clutch shaft and brake cylinder and the amount of material required for the installation is substantially less, by weight, than that used in the more usual types. At the same time it is possible to make use of stampings rather than forgings, with a consequent economy. Further, the use of a single frame member for support renders the components more accessible than when, as heretofore, they have been mounted indiscriminately on the regular frame members or on separate cross members provided for that purpose.

Some changes may be made in the arrangement, construction and combination of the various parts of the improved device without departing from the spirit of the invention, and it is the intention to cover by the claims, such changes as may reasonably be included within the scope thereof.

The invention claimed is:

1. In a motor vehicle construction, a frame comprising a side sill and an X member having one end secured to said sill adjacent the forward portion thereof, an auxiliary frame member having its rear end secured to said X member and extending forwardly therefrom substantially parallel with the longitudinal axis of said vehicle to said sill and having its forward end secured thereto, a cross shaft mounting secured to said auxiliary frame member and having shaft portions extending transversely on each side thereof, an anchorage for a clutch actuating cross shaft secured to one side of said auxiliary frame member, a brake master cylinder secured to the other side of said auxiliary frame member, operating pedals mounted on said extending shaft portions, and linkage operatively connecting said pedals with said clutch actuating shaft and said master brake cylinder.

2. In a motor vehicle construction, a frame comprising a side sill and an X member having one end secured to said sill adjacent the forward portion thereof, an auxiliary frame member having its rear end secured to said X member and extending forwardly therefrom substantially parallel with the longitudinal axis of said vehicle to said sill and having its forward end secured thereto, a cross shaft mounting secured to said auxiliary frame member and having shaft portions extending transversely on each side thereof, an anchorage for a clutch actuating cross shaft secured to one side of said auxiliary frame member forwardly of said mounting, a brake master cylinder secured to the other side of said auxiliary frame member on the opposite side of said auxiliary frame member forwardly of said anchorage adjacent said sill, operating pedals mounted on said extending shaft portions, and linkage operatively connecting said pedals with said clutch actuating shaft and said brake master cylinder.

3. In a motor vehicle construction, a longitudinal channel frame member substantially parallel to the longitudinal axis of the vehicle, an opening in the web of the channel and a shaft mounted centrally in said opening and at right angles thereto, said shaft being mounted in a shaft mounting secured to the channel and comprising a pair of substantially complementary bell-shaped stampings provided with circumferentially extending flanges disposed in face-to-face relationship and spot welded together, said stampings having a central aperture formed in the base of each and inturned flanges from said bases around said central aperture substantially normal to said circumferential flanges, said shaft being supported by said central flanges, internally welded to one of the central inturned flanges and adapted to mount a rotatable member on each end.

JOHN J. WHARAM.
CHARLES P. PINARDI.